US010482049B2

(12) United States Patent
Caporale et al.

(10) Patent No.: US 10,482,049 B2
(45) Date of Patent: Nov. 19, 2019

(54) CONFIGURING NVME DEVICES FOR REDUNDANCY AND SCALING

(71) Applicant: LENOVO ENTERPRISE SOLUTIONS (SINGAPORE) PTE. LTD., Singapore (SG)

(72) Inventors: Patrick L. Caporale, Cary, NC (US); Randolph S. Kolvick, Durham, NC (US); Pravin Patel, Cary, NC (US); Gregory B. Pruett, Raleigh, NC (US); Theodore B. Vojnovich, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 288 days.

(21) Appl. No.: 15/423,747

(22) Filed: Feb. 3, 2017

(65) Prior Publication Data
US 2018/0225054 A1    Aug. 9, 2018

(51) Int. Cl.
G06F 12/10    (2016.01)
G06F 13/40    (2006.01)
(Continued)

(52) U.S. Cl.
CPC ...... *G06F 13/4027* (2013.01); *G06F 12/0223* (2013.01); *G06F 12/10* (2013.01); *G06F 13/4022* (2013.01); *G06F 13/4068* (2013.01); *G06F 13/4282* (2013.01); *G06F 2213/0024* (2013.01)

(58) Field of Classification Search
CPC ............ G06F 13/4027; G06F 13/4282; G06F 13/4068; G06F 13/4022; G06F 12/0223; G06F 12/10; G06F 2213/0024
See application file for complete search history.

(56) References Cited

U.S. PATENT DOCUMENTS

2013/0227236 A1*  8/2013  Flynn ..................... G11C 16/26
                                                                711/165
2014/0281040 A1*  9/2014  Liu ........................... G06F 9/50
                                                                 710/3

(Continued)

OTHER PUBLICATIONS

Intel, *Achieving NVMe Shared Storage with E8's HA NVMe Enclosure and Intel Datacenter SSD*, Intel.com (online), dated 2016 [accessed Sep. 8, 2016], 4 pages, URL: builders.intel.com/docs/storagebuilders/Achieving-NVMe-Shared-Storage-with-E8.pdf.

(Continued)

*Primary Examiner* — Hiep T Nguyen

(57) ABSTRACT

Configuring NVMe devices for redundancy and scaling includes: identifying, by a first SSD ('Solid State Drive') driver executing on a first CPU ('Central Processing Unit'), address space of a first SSD coupled to the first CPU by a first PCI ('Peripheral Component Interconnect') switch, the first PCI switch including one or more non-transparent bridges ('NTBs'); partitioning, by the first SSD driver, the address space of the first SSD amongst the NTBs of the first PCI switch and the first CPU, where each NTB is configured to translate CPU memory addresses received from a CPU into a drive address in the address space partitioned to the NTB; and partitioning, by the first SSD driver, a plurality of namespaces of the first SSD amongst the first CPU and the NTBs.

20 Claims, 9 Drawing Sheets

(51) Int. Cl.
    *G06F 12/02*         (2006.01)
    *G06F 13/42*         (2006.01)

(56) References Cited

U.S. PATENT DOCUMENTS

| | | | |
|---|---|---|---|
| 2015/0304423 A1* | 10/2015 | Satoyama | H04L 67/1097 709/223 |
| 2017/0344312 A1* | 11/2017 | Seo | G06F 12/109 |
| 2018/0307521 A1* | 10/2018 | Pinto | G06F 9/45558 |

OTHER PUBLICATIONS

Reddi, *Mirroring NVMe drives?*, Reddit.com (online), [accessed Sep. 8, 2016], 4 pages, URL: www.reddit.com/r/sysadmin/comments/46dzyj/mirroring_nvme_drives/.

* cited by examiner

CONFIGURING NVME DEVICES FOR REDUNDANCY AND SCALING

BACKGROUND

Field of the Invention

The field of the invention is data processing, or, more specifically, methods, apparatus, and products for configuring NVMe devices for redundance and scalability.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, apparatus, and products for configuring NVMe devices for redundancy and scalability are disclosed in this specification. Such a configuration includes: identifying, by a first SSD ('Solid State Drive') driver executing on a first CPU ('Central Processing Unit'), address space of a first SSD coupled to the first CPU by a first PCI ('Peripheral Component Interconnect') switch, the first PCI switch including one or more non-transparent bridges ('NTBs'); partitioning, by the first SSD driver, the address space of the first SSD amongst the NTBs of the first PCI switch and the first CPU, where each NTB is configured to translate CPU memory addresses received from a CPU into a drive address in the address space partitioned to the NTB; and partitioning, by the first SSD driver, a plurality of namespaces of the first SSD amongst the first CPU and the NTBs.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
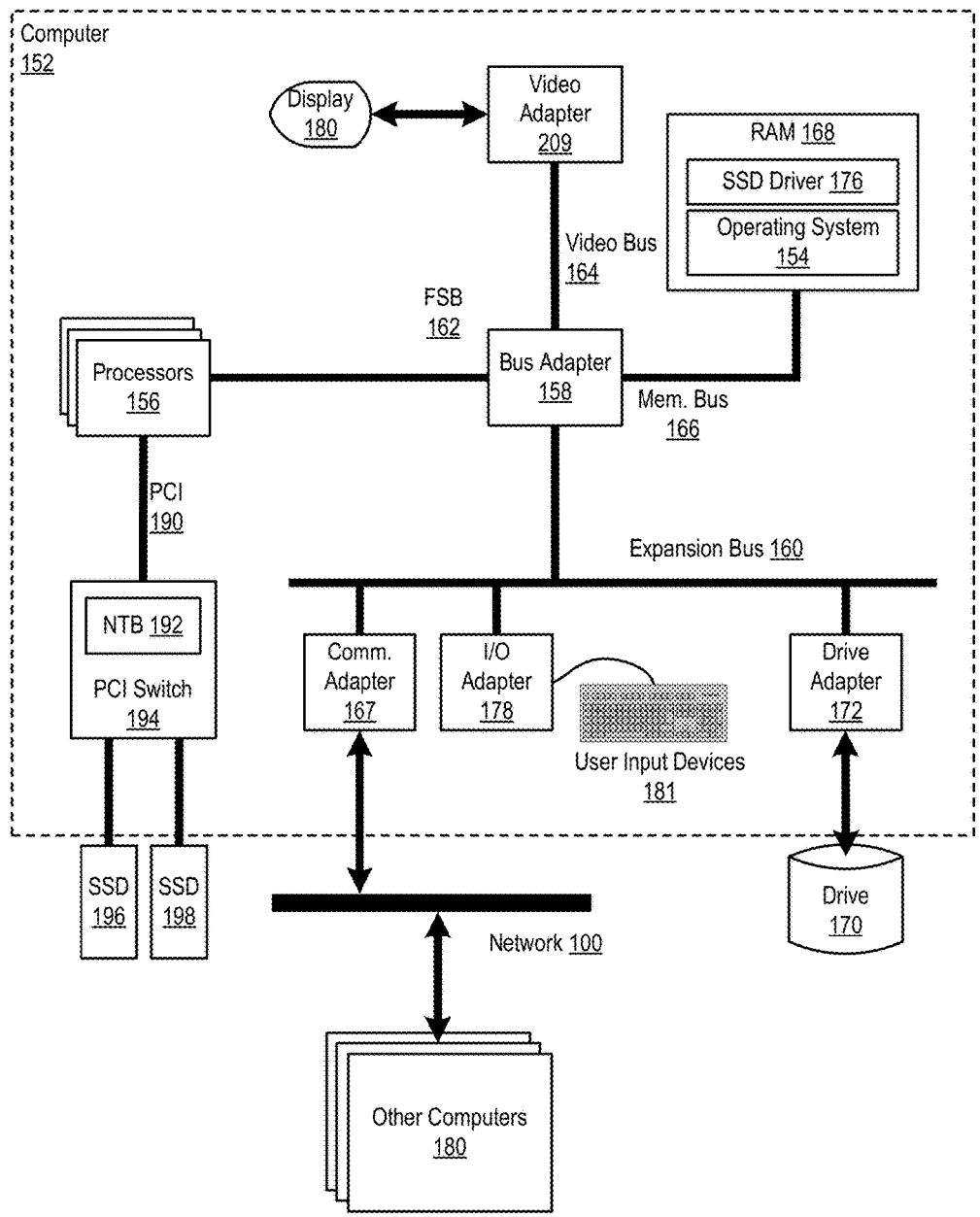
FIG. 1 sets forth a block diagram of a system configured for configuring NVMe devices for redundancy and scaling according to embodiments of the present invention.

Exemplary methods, apparatus, and products for configuring NVMe (Non-Volatile Memory Express) devices for redundancy and scaling in accordance with the present invention are described with reference to the accompanying drawings, beginning with FIG. 1. FIG. 1 sets forth a block diagram of a system configured for configuring NVMe devices for redundancy and scaling according to embodiments of the present invention. The system of FIG. 1 includes an example of automated computing machinery in the form of a computer (152).

The example computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). The CPU is also coupled through a Peripheral Component Interconnect ('PCI') bus (190) to a number of solid state drives (SSDs) (196, 198) through a PCI switch (194).

The PCI bus (190) in the example of FIG. 1 may be implemented according to any of the PCI standard protocols. For example, the PCI bus (190) in the example of FIG. 1 may be implemented as a PCI Express ('PCIe') bus.

The example PCI switch in the system of FIG. 1 includes a non-transparent bridge ('NTB') (192). Although only one NTB is depicted in the example of FIG. 1, readers of skill in the art will recognize that a PCI switch operating according to the NVMe interface specification may include any number of NTBs. An NTB enables isolation of memory domains, so that two CPUs having overlapping CPU memory addresses may utilize those addresses without conflict. The term 'CPU memory address' as used in this specification refers to an address, used by a CPU, to perform memory-type operations. The operations are referred to as 'memory-type' because the operations are in the form of memory operations but may not actually effect operations in a memory cell. In some instances, for example, the memory-type operations may carry out data communications on a bus, such as a PCI bus. The term 'drive address' as used in this specification refers to an address associated with a memory location in an SSD (196, 198). A drive address may be further translated by a controller of the SSD (196). In the example of FIG. 1, the NTB may translate a CPU memory address received from one of the processors (156) into a drive address of one of the SSDs (196, 198).

Each of the SSDs (196, 198) in the example of FIG. 1 may communicate with the PCI switch (194) in accordance with an NVMe (Non-Volatile Memory Express) device interface specification. The NVMe specification is an I/O protocol for interfacing with a non-volatile memory subsystem over PCIe.

The PCI switch, including the NTB, may be configured upon startup of the computing system, dynamically or upon request by a driver of an SSD. Stored in RAM (168) of the example computer of FIG. 1 is such an SSD driver (176). The example SSD driver (176) of FIG. 1 is configured for configuring NVMe devices for redundancy and scaling according to embodiments of the present invention. The SSD driver (176) may carry out configuring NVMe devices for redundancy and scaling by: identifying, by the SSD driver (176) executing on a first CPU (156), address space of a first SSD (196) coupled to the first CPU (156) by the PCI switch (194); partitioning, by the SSD driver (176), the address space of the first SSD (196) amongst the NTBs (192) of the PCI switch (198) and the first CPU, where each NTB (192) is configured to translate CPU memory addresses received from a CPU into a drive address in the address space partitioned to the NTB; and partitioning, by the SSD driver (176), a plurality of namespaces of the first SSD (196) amongst the first CPU and the NTBs (192).

The term 'namespace' as used here refers to a logical grouping of non-volatile memory, where each logical group is associated with a queue pair. Each logical grouping may be a range or ranges of addresses within the SSD. Each queue pair may include a submission queue and a completion queue for operations directed to addresses of the logical group. The submission queue may store operations received from an SSD driver to perform on the memory of the SSD (a read, write, or erase, for example). Once an operation from the submission queue is performed by the SSD (and the SSD's controller), the operation is copied into the completion queue for later processing by the SSD driver.

Also stored in RAM (168) is an operating system (154). Operating systems useful in computers configured for configuring NVMe devices for redundancy and scaling according to embodiments of the present invention include UNIX™, Linux™, Microsoft Windows™, AIX™ IBM's iOS™, and others as will occur to those of skill in the art. The operating system (154) and SSD driver (176) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for configuring NVMe devices for redundancy and scaling according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for configuring NVMe devices for redundancy and scaling according to embodiments of the present invention include modems for wired dial-up communications, Ethernet (IEEE 802.3) adapters for wired data communications, and 802.11 adapters for wireless data communications.

The arrangement of computer systems and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
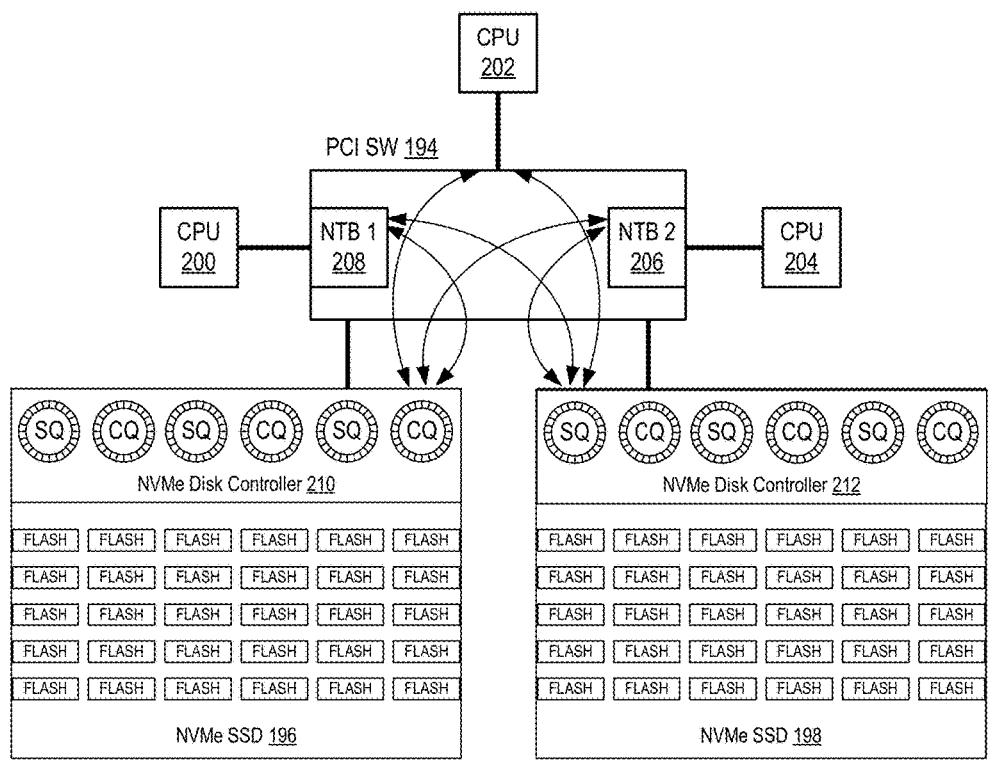
FIG. 2 sets forth a block diagram of a system configured for NVMe device redundancy and scaling according to embodiments of the present invention.

For further explanation, FIG. 2 sets forth a block diagram of a system configured for NVMe device redundancy and scaling according to embodiments of the present invention. The system of FIG. 2 includes several CPUs (200, 202, 204) which are coupled through a PCI bus to a number of NVMe SSDs (196, 198) through a PCI switch (194).

The PCI switch (194) in the system of FIG. 2 includes two non-transparent bridges ('NTB') (206, 208). Although only two NTBs are depicted in the example of FIG. 2, readers of skill in the art will recognize that a PCI switch operating according to the NVMe interface specification may include any number of NTBs. In the example system of FIG. 2, each NTB is coupled to one, and in this example only one, CPU. However, one CPU, typically assigned as a 'master' or 'primary' CPU is not coupled to an NTB. As explained above, the NTB's enable each CPU to address the PCI switch with the CPU memory addresses, even if another CPU has overlapping CPU memory addresses that would otherwise conflict. The CPU not coupled to the NTB can be assured that the CPU memory addresses used by the CPU (202) does not conflict with those of CPUs coupled to the NTBs because the NTBs can be configured in such a way as to remove any such conflicts. In some embodiments of the present invention, the master CPU (202) executes the SSD driver that configures the NVMe SSDs (196, 198) for redundancy and scaling.

Each NVMe SSD (196, 198) includes an NVMe Disk controller (210, 212). The NVMe SSDs may be configured by an SSD driver (not shown in FIG. 2), for redundancy and scalability. The SSD driver, for example, may: identify address space of a first SSD (196); partition the address space of the first SSD (196) amongst the NTBs (208, 206) and a CPU not coupled to an NTB; and partition a plurality of namespaces of the first SSD (196) amongst the NTBs and the CPU not coupled to the NTB. Likewise, the SSD driver may partition address space and namespaces of the second SSD (198) of FIG. 2 amongst the NTBs (208, 206) and the CPU (202).

Partitioning a namespace amongst a CPU (not coupled to an NTB of the PCI switch) and the NTBs of the PCI switch may also be referred to here as assigning a namespace to a CPU. Because each NTB is coupled to one, and in this example only one, CPU, partitioning a namespace to the NTB is equivalent to portioning a namespace to the CPU coupled to the NTB.

Each NVMe disk controller (210) of FIG. 2 maintains and administers queue pairs for each namespace of the SSD (196, 198). Each queue pair may be assigned ('partitioned') to a CPU not coupled to an NTB, such as CPU (202) in the example of FIG. 2, and one or more NTBs. In the example of FIG. 2, each NVMe SSD (196, 198) includes three queue pairs. One queue pair from each SSD is assigned to one of the NTBs or CPU. For example:

a. CPU (200), through NTB (208), may be assigned a first queue pair from NVMe SSD (196) and a first queue pair from NVMe SSD (198);

b. CPU (202) (not coupled to an NTB) may be assigned a second queue pair from NVMe SSD (196) and a second queue pair from NVMe SSD (198); and c. CPU (204), through NTB (206), may be assigned a third queue pair from NVMe SSD (196) and a third queue pair from NVMe SSD (198).

Once the system of FIG. 2 is configured for NVMe device redundancy and scaling, the example PCI Switch (194) of FIG. 2 may: receive, by the first NTB (208) of the PCI switch (194) from CPU (200) coupled to the first NTB (208), a transaction. The transaction includes a command (such as read, write or erase), a CPU memory address, and a namespace identifier specifying the namespace partitioned to the first NTB (208). The first NTB (208) may translate the CPU memory address to a drive address in the address space partitioned to the first NTB (208) and store, in a queue of the namespace of the NVMe Disk Controller (210) of the NVMe Disk (196) specified by the namespace identifier, the command of the transaction and the translated drive address. The PCI Switch (194) may also: receive, by the first NTB (208) of the PCI switch (194) from CPU (200) coupled to the first NTB (208), a second transaction, where the second transaction includes a command, a CPU memory address, and a namespace identifier specifying the namespace partitioned to the first NTB (208). The first NTB (208) translates the CPU memory address to a drive address in the address space partitioned to the first NTB (208) and stores, in a queue of the namespace of NVMe Disk Controller (212) of the NVMe Disk (198) specified by the namespace identifier, the command of the transaction and the translated drive address. That is, one CPU (200), may perform drive operations on either of the SSDs (196, 198) in a namespace assigned to the CPU using the CPU's own CPU memory addresses, without any conflict with CPU memory addresses of other CPUs. Likewise, each of the other CPUs may perform drive operations with on either of the SSDs (196, 198), in a namespace assigned to that CPU using the CPU's own CPU memory addresses, without any conflict with CPU memory addresses of other CPUs.

The system of FIG. 2 is configured for data redundancy in case of failure of an SSD. For example, CPU (200) may store one copy of data on a NVMe SSD (196) and a second copy of the date on NVMe SSD (198). If either drive fails, a copy of the data remains on the active drive. Such copies of data may be mirrored copies, copies of RAID data, or the like.

Figure 3:
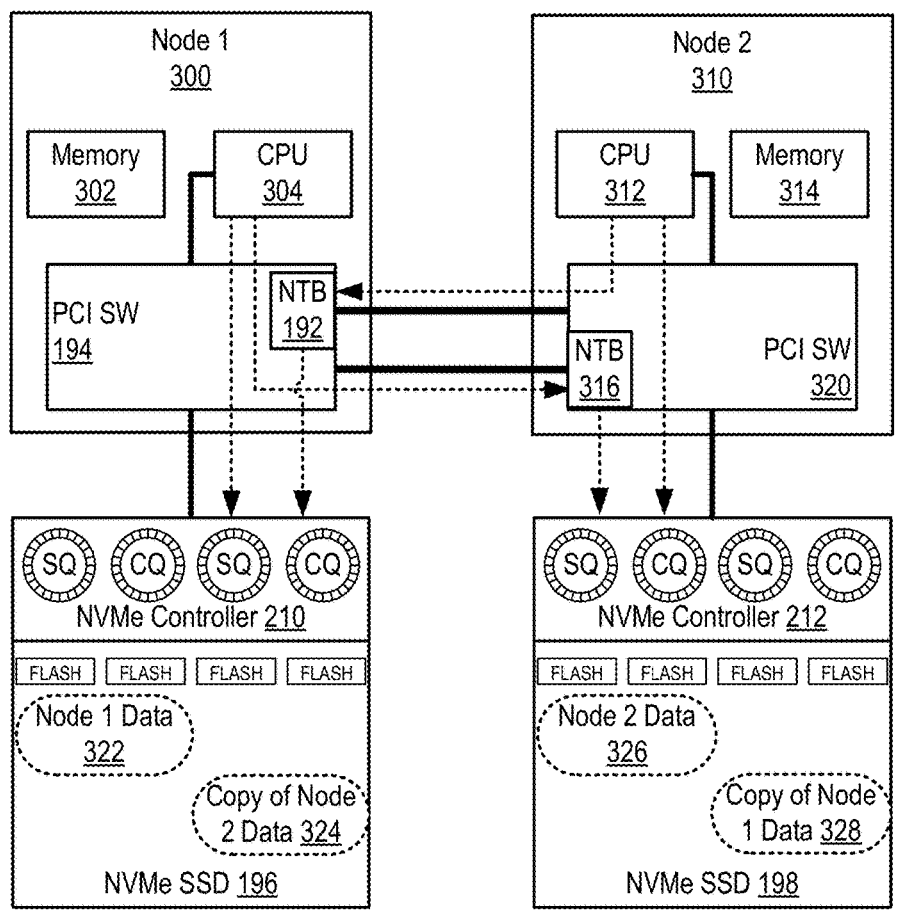
FIG. 3 sets forth a block diagram of another example system configured for NVMe device redundancy and scaling according to embodiments of the present invention.

For further explanation, FIG. 3 sets forth a block diagram of another example system configured for NVMe device redundancy and scaling according to embodiments of the present invention. The system of FIG. 3 is similar to the system of FIG. 2 in that the system of FIG. 3 includes several CPUs (304, 314) which are coupled through PCI busses to a number of NVMe SSDs (196, 198) through PCI switches (194, 320). The system of FIG. 3 differs from the system of FIG. 2, however, in that each CPU in the example of FIG. 3 is included in a separate compute node (300, 310). Each compute node represents a self-contained computing system that includes the CPU as well as main computer memory (302, 312), in the form of RAM or some other memory structure. Each node (300, 310) also includes a PCI switch (194, 320).

In the example of FIG. 3, the CPU (304) of the first node (300) is coupled to the PCI switch (194) of the first node (300). The PCI switch (194) of the first node (300) is coupled to the first SSD (196) and includes an NTB (192). The NTB (192) is coupled to a PCI switch (320) of the second node (310).

The CPU (312) of the second node (310) is coupled to the PCI switch (320) of the second node (310). The PCI switch (320) of the second node (310) is coupled to the second SSD (198) and includes an NTB (316). The NTB (316) of the second PCI switch (320) is coupled to the PCI switch (194) of the first node (300).

The system of FIG. 3 may be configured by an SSD driver (not shown in FIG. 3), for redundancy and scalability by: identifying address space of a first SSD (196); partitioning the address space of the first SSD (196) amongst the NTB (192) of the PCI switch (194) of the first node (300) and the CPU (304) of the first node; and partitioning a plurality of namespaces of the first SSD (196) amongst the CPU of the first node and the NTB of the PCI switch of the first node. Because the NTB (192) of the PCI switch (194) of the first node (300) is coupled to the CPU (312) of the second node (310), readers of skill in the art will recognize that partitioning address space and a namespace to the NTB (192) of the PCI switch (194) of the first node (300) is effectively equivalent to partitioning that address space and namespace to the CPU (312) of the second node (310).

In a similar manner, the SSD driver may partition address space and namespaces of the second SSD (198) of FIG. 2 amongst the CPU (312) of the second node (310) and the NTB (316) of the PCI switch (320) of the second node (310). Because the NTB (316) of the PCI switch (320) of the second node (310) is coupled to the CPU (304) of the first node (300), readers of skill in the art will recognize that partitioning address space and a namespace to the NTB (316) of the second node is effectively equivalent to partitioning that address space and namespace to the CPU (304) of the first node (300).

Once configured for redundancy and scalability according to embodiments the present invention, the system of FIG. 2 may operate for data redundancy in case of a node failure. To that end, the PCI switch (194) of the first node (300) may receive a transaction from the CPU (304) of the first node to store a primary copy of data, where the transaction includes a first command, a first drive memory address, and a first identifier of a namespace. The PCI switch (194) of the first node (300) may then store the primary copy (322) of the data in the first SSD (196) including storing in a queue of the identified namespace in the first SSD, by the first PCI switch, the first command and the first drive memory address.

The NTB (316) of the PCI switch (320) of the second node (310) may also receive, from the CPU (304) of the first node (300), a transaction to store a redundant copy of the data, where the transaction to store the redundant copy of the data comprising a second command, a CPU memory address, and a second identifier of a namespace. The NTB (316) of the PCI switch (320) of the second node (310) may then translate the CPU memory address to an address in the address space of the second SSD (198) partitioned to the NTB (316) of the PCI switch (320) of the second node (310). The PCI switch (320) of the second node may store the redundant copy (328) of the data in the second SSD (198) including storing in a queue of the identified namespace in the second SSD, by the second PCI switch, the second command of the transaction and the translated address of the second SSD.

Likewise, the CPU (312) of the second node may store a primary copy of data (326) through a transaction directed to the PCI switch (320) of the second node and store a redundant copy (324) of the data through a transaction directed to the NTB (192) of the PCI switch (194) of the first node). In this way, if one node fails, a copy (primary or redundant) of the data remains present on an SSD not coupled to the failed node.

Figure 4:
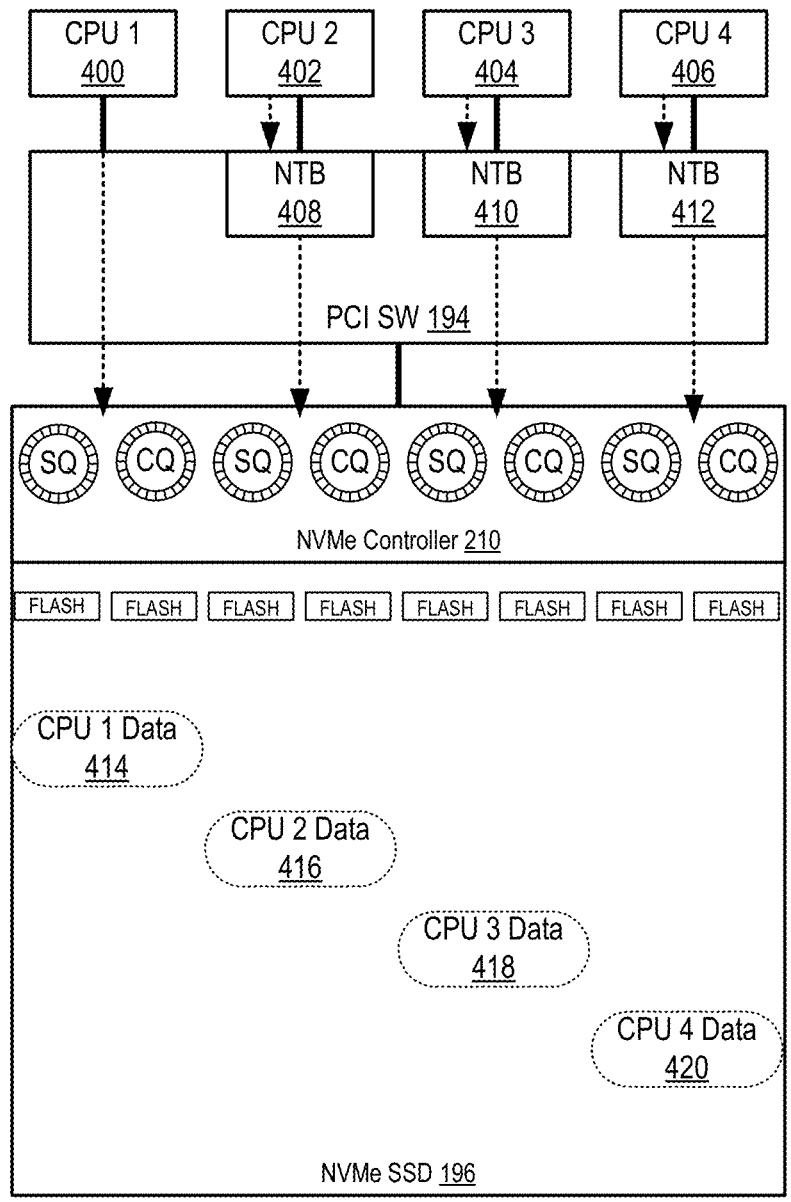
FIG. 4 sets forth a block diagram of another example system configured for NVMe device redundancy and scaling according to embodiments of the present invention.

For further explanation, FIG. 4 sets forth a block diagram of another example system configured for NVMe device redundancy and scaling according to embodiments of the present invention. The system of FIG. 4 is similar to the system of FIG. 2 in that the system of FIG. 4 includes several CPUs (400, 402, 404, 406) which are coupled through PCI busses to one NVMe SSDs (196) through a PCI switch (194). The system of FIG. 4 differs from the system of FIG. 2, however, in that in the system of FIG. 4, the PCI switch (194) is coupled to only a single SSD.

The system of FIG. 4 enables scaling of the NVMe SSD (196). That is, the NVMe SSD may be configured such that additional or fewer CPUs may be added to the system. In the example system of FIG. 4, the PCI switch (194) couples four CPUs (400, 402, 404, 406) to an NVMe SSD (196). Three of the fours CPUs are coupled to an NTB (408, 410, 412). Each CPU (or associated NTB) may be partitioned address space of the NVMe SSD (196) and a namespace of the SSD.

The address space and namespaces may be partitioned amongst the CPUs (or the associated NTBs) in a variety of manners. In one example embodiment, the address space and namespaces of the SSD (196) may be allocated equally amongst the CPUs in the system. In the example of FIG. 4, each CPU may be allocated a quarter of the available address space. As such, each CPU may store data (414, 416, 418, 420) in the address space allocated to the CPU.

In another embodiment, the address space and namespaces of the SSD (196) may be partitioned in dependence upon a user-selected allocation. That is, the SSD driver or other firmware may provide a user interface through which a user may specify an amount of address space to assign to CPUs of the system. For example, in a system of four CPUs, a user may specify that 40% of the available address space of the SSD be provided to the primary CPU and 10% of the available address space of the SSD be provided to the remaining three CPUs while any additional space is not allocated until a later time. The user may also assign one or more namespaces to each CPU and set namespace parameters, such as size, capacity, formatted logical block address size, End-to-end data protection settings, multi-path I/O and sharing capacity settings, and so on.

In another embodiment, the address space and namespaces of the SSD (196) may be allocated in preparation for one or more additional CPUs to be coupled to the PCI switch at a later time. In the system of FIG. 4, for example, the SSD driver may allocate six namespaces and six address spaces, where four of the six namespaces and address spaces are allocated to the CPUs (400, 402, 404, 406) and the remaining two namespaces and address spaces are available for additional CPUs to be added to the system at a later time.

Figure 5:
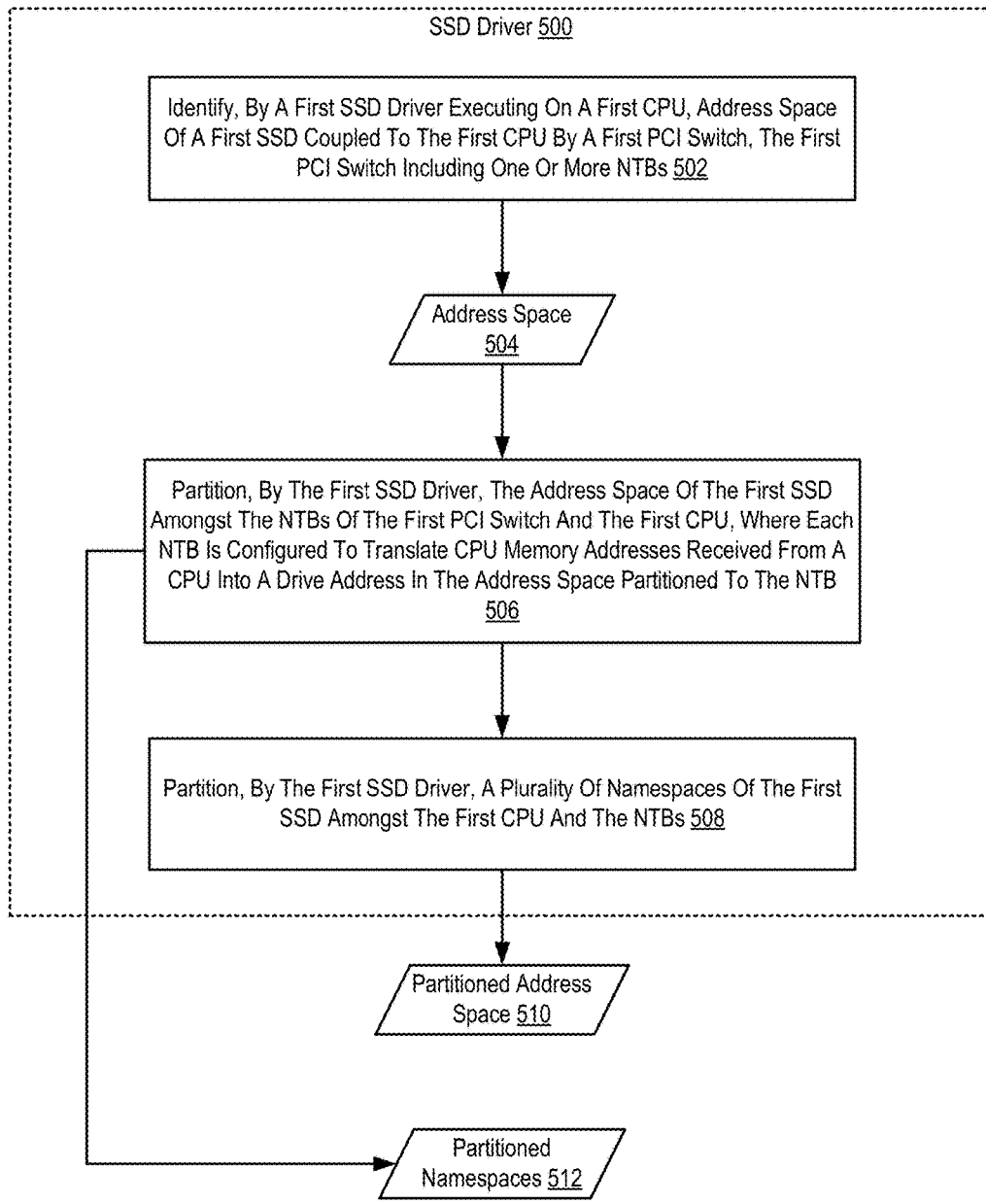
FIG. 5 sets forth a flow chart illustrating an exemplary method for configuring NVMe devices for redundancy and scaling according to embodiments of the present invention.

For further explanation, FIG. 5 sets forth a flow chart illustrating an exemplary method for configuring NVMe devices for redundancy and scaling according to embodiments of the present invention. The method of FIG. 5 may be carried out by an SSD driver (500) in a system similar to that set forth in the example of FIG. 1.

The method of FIG. 5 includes identifying (502), by a first SSD driver (500) executing on a first CPU, address space (504) of a first SSD coupled to the first CPU by a first PCI switch. The first PCI switch includes one or more NTBs. Identifying (502) address space (504) of the first SSD may be carried out by querying a disk controller of the SSD for capacity information including addressable memory space (logical block address range).

The method of FIG. 5 also includes partitioning (506), by the first SSD driver (500), the address space (510) of the first SSD amongst the NTBs of the first PCI switch and the first CPU. In the method of FIG. 5, each NTB is configured to translate CPU memory addresses received from a CPU into a drive address in the address space partitioned to the NTB. Partitioning (506) the address space (504) of the first SSD amongst the NTBs of the first PCI switch and the first CPU may be carried out by associating drive addresses with CPU memory addresses in one or more data structure accessible to each NTB of the PCI switch.

The method of FIG. 5 also includes partitioning (508), by the first SSD driver (500), a plurality of namespaces (512) of the first SSD amongst the first CPU and the NTBs. Partitioning namespaces (512) amongst the first CPU and the NTBs may be carried out by providing a unique namespace identifier to each NTB.

Figure 6:
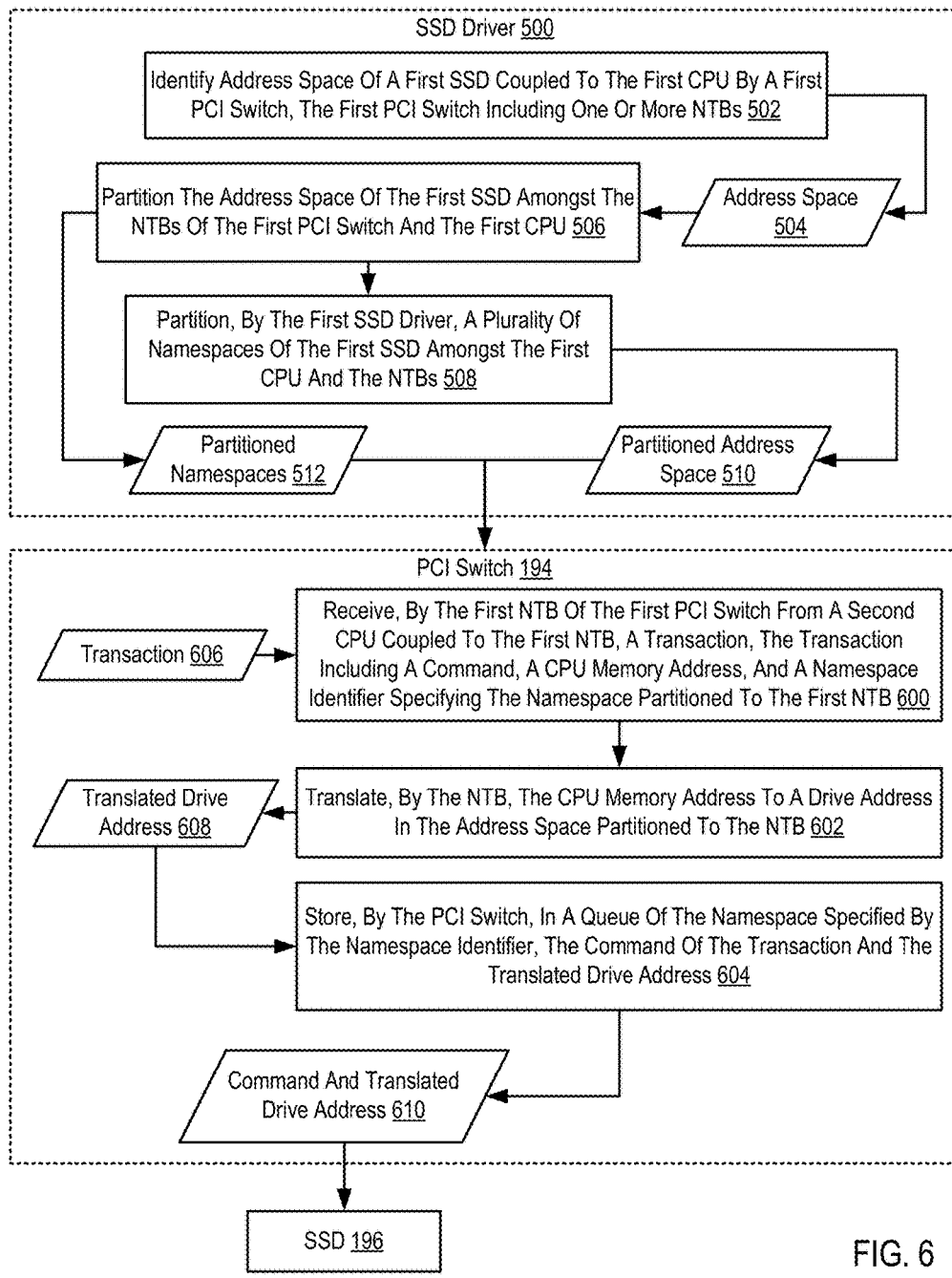
FIG. 6 sets forth a flow chart illustrating an additional method for configuring NVMe devices for redundancy and scaling according to embodiments of the present invention.

For further explanation, FIG. 6 sets forth a flow chart illustrating an additional method for configuring NVMe devices for redundancy and scaling according to embodiments of the present invention. The method of FIG. 6 may be carried out in a system similar to that of FIG. 4.

The example method of FIG. 6 is similar to the method of FIG. 5, as it also includes identifying (502), by a first SSD driver executing on a first CPU (500), address space of a first SSD (504) coupled to the first CPU by a first PCI switch, the first PCI switch including one or more NTBs, partitioning (506), by the first SSD driver (500), the address space of the first SSD amongst the NTBs of the first PCI switch and the first CPU (510), where each NTB is configured to translate CPU memory addresses received from a CPU into a drive address in the address space partitioned to the NTB, and partitioning (508), by the first SSD driver, a plurality of namespaces of the first SSD amongst the first CPU and the NTBs (512).

The example method of FIG. 6 differs from the method of FIG. 5 in that the example of FIG. 6 includes receiving (600), by the first NTB of the first PCI switch (194) from a second CPU coupled to the first NTB, a transaction (606), the transaction including a command, a CPU memory address, and a namespace identifier specifying the namespace partitioned to the first NTB, translating (602), by the NTB, the CPU memory address to a drive address in the address space partitioned to the NTB (608), and storing (604), by the PCI switch (194), in a queue of the namespace specified by the namespace identifier, the command of the transaction and the translated drive address (610).

The method of FIG. 6 may be applied to any CPU coupled to the PCI switch. In this way, the method of FIG. 6 enables scaling by addition of CPUs to one or more SSDs without conflict of CPU address conflicts.

Figure 7:
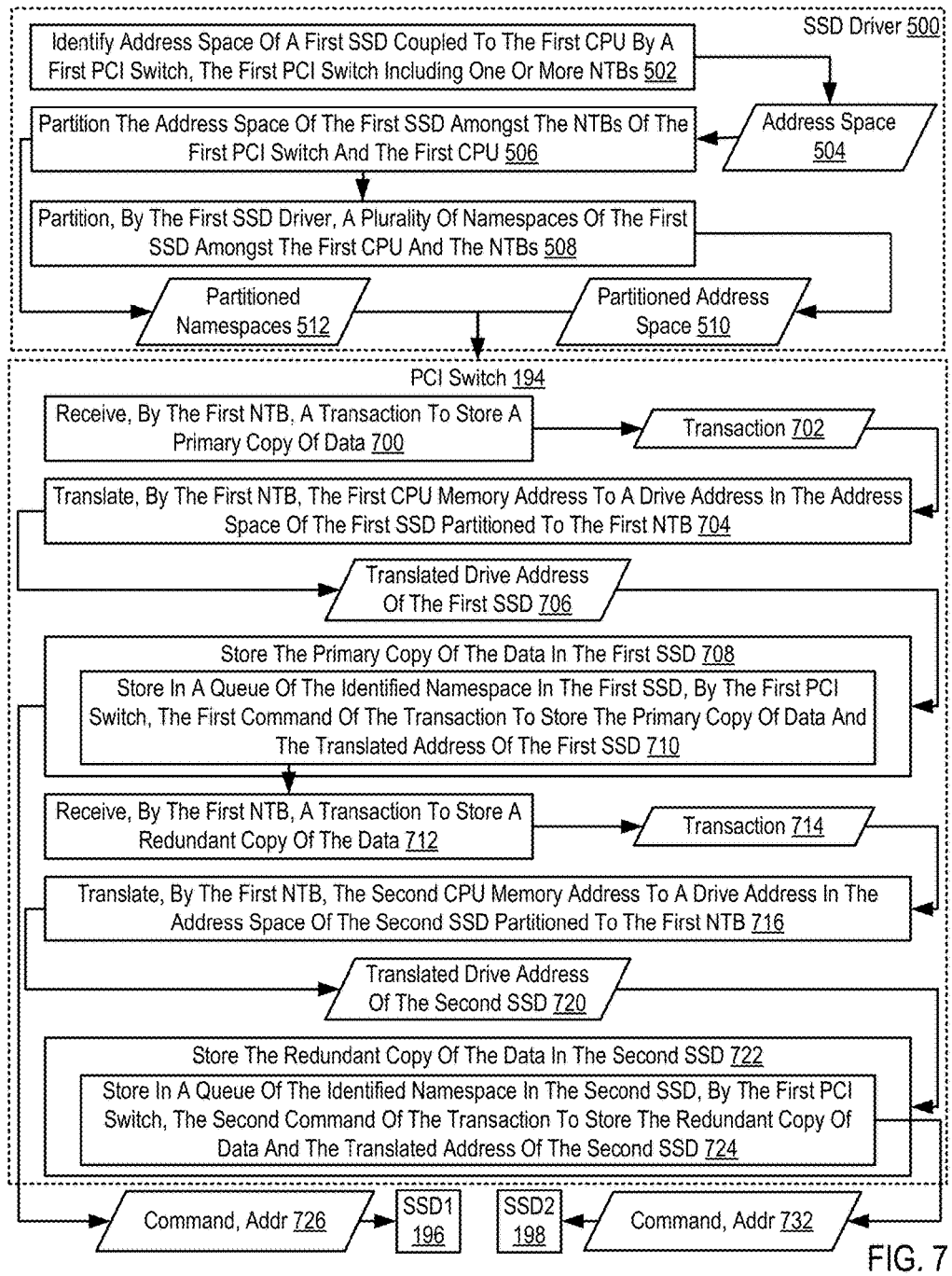
FIG. 7 sets forth a flow chart illustrating an additional method for configuring NVMe devices for redundancy and scaling according to embodiments of the present invention.

For further explanation, FIG. 7 sets forth a flow chart illustrating an additional method for configuring NVMe devices for redundancy and scaling according to embodiments of the present invention. The example method depicted in FIG. 7 is similar to the example method depicted in FIG. 5, as it also includes identifying (502), by a first SSD driver executing on a first CPU (500), address space of a first SSD (504) coupled to the first CPU by a first PCI switch, the first PCI switch including one or more NTBs, partitioning (506), by the first SSD driver (500), the address space of the first SSD amongst the NTBs of the first PCI switch and the first CPU (510), where each NTB is configured to translate CPU memory addresses received from a CPU into a drive address in the address space partitioned to the NTB, and partitioning (508), by the first SSD driver, a plurality of namespaces of the first SSD amongst the first CPU and the NTBs (512).

In the method of FIG. 7, the first NTB of the first PCI switch is coupled to a second CPU and the first PCI switch is coupled to a second SSD, where an address space of the second SSD and a plurality of namespaces are partitioned amongst the first CPU and the first NTB.

To that end, the method of FIG. 7 also includes receiving (700), by the first NTB (194), a transaction (702) to store a primary copy of data. The method of FIG. 7 also includes translating (704), by the first NTB (194), the first CPU memory address to a drive address (706) in the address space of the first SSD (196) partitioned to the first NTB. The method of FIG. 7 also includes and storing (708) the primary copy of the data in the first SSD (196). In the method of FIG. 7, storing (708) the primary copy in the first SSD (196) is carried out by storing (710) in a queue of the identified namespace in the first SSD, by the first PCI switch (194), the first command of the transaction to store the primary copy of data and the translated address (726) of the first SSD (196).

The example method of FIG. 7 further also includes receiving (712), by the first NTB (194), a transaction (714) to store a redundant copy of the data. The method of FIG. 7 also includes translating (716), by the first NTB (194), the second CPU memory address to a drive address (720) in the address space of the second SSD (198) partitioned to the first NTB (194). The method of FIG. 7 also includes storing (722) the redundant copy of the data in the second SSD (198) including storing (724) in a queue of the identified namespace in the Second SSD (198), by the first PCI switch (194), the second command of the transaction to store the redundant copy of data and the translated address (732) of the second SSD (198).

The method of FIG. 7 may be carried out in a system similar to that set forth in FIG. 2. To that end, the method of FIG. 7 enables high availability of data in the case of a drive failure. That is, if one drive fails, a copy, whether redundant or primary, is available on the remaining, active drive.

Figure 8:
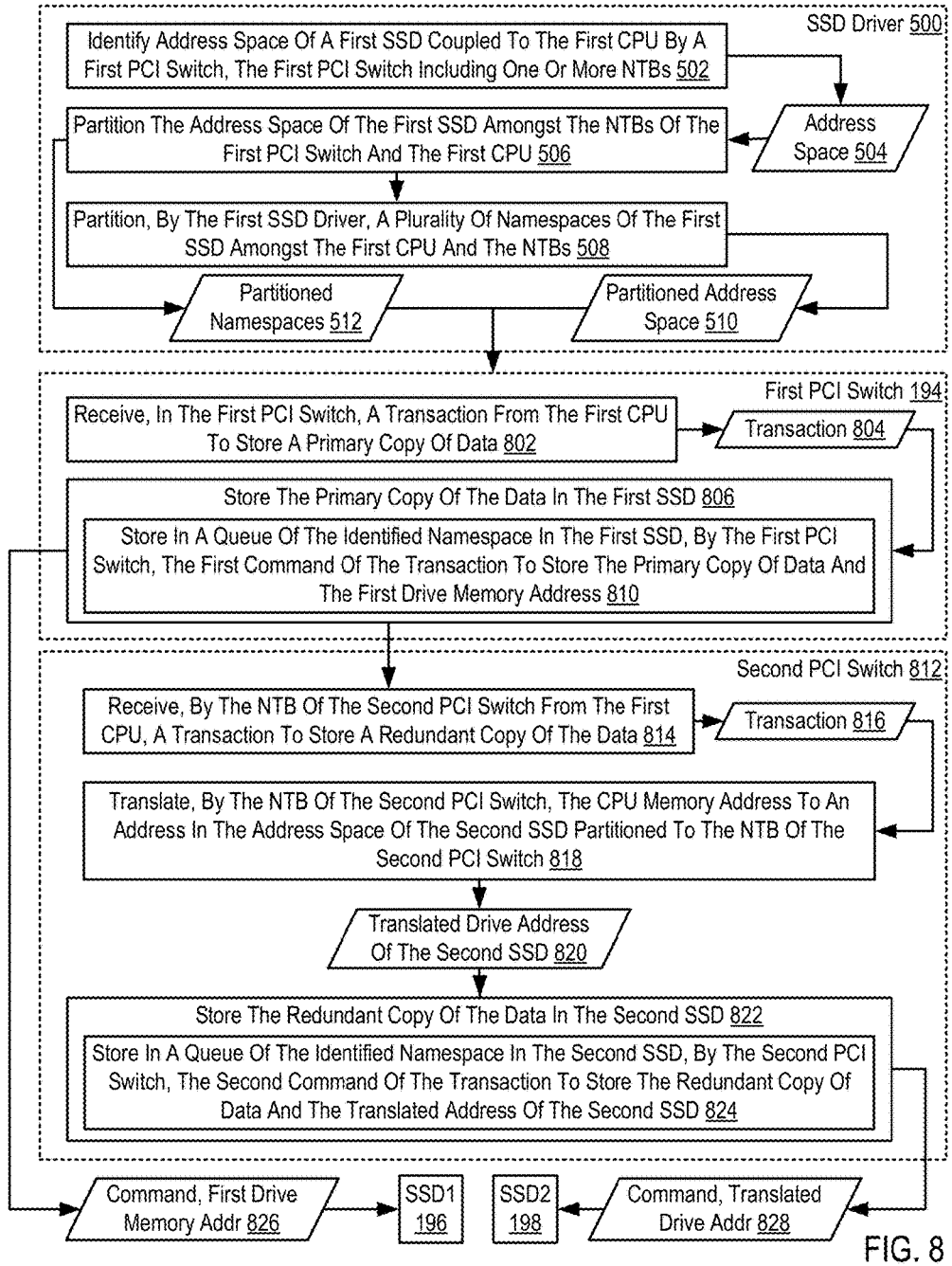
FIG. 8 sets forth a flow chart illustrating an additional method for configuring NVMe devices for redundancy and scaling according to embodiments of the present invention.

For further explanation, FIG. 8 sets forth a flow chart illustrating an additional method for configuring NVMe devices for redundancy and scaling according to embodiments of the present invention. The example method depicted in FIG. 8 is similar to the example method depicted in FIG. 5, as it also includes identifying (502), by a first SSD driver executing on a first CPU (500), address space of a first SSD (504) coupled to the first CPU by a first PCI switch, the first PCI switch including one or more NTBs, partitioning (506), by the first SSD driver (500), the address space of the first SSD amongst the NTBs of the first PCI switch and the first CPU (510), where each NTB is configured to translate CPU memory addresses received from a CPU into a drive address in the address space partitioned to the NTB, and partitioning (508), by the first SSD driver, a plurality of namespaces of the first SSD amongst the first CPU and the NTBs (512).

In the method of FIG. 8, the first CPU and the first PCI switch (194) a first computing system coupled to the first SSD (196) and the first PCI switch (194) is coupled to an NTB of a second PCI switch (812). The second PCI switch (812) is included in a second computing system. The second computing system also includes a second CPU and a second SSD (198), where the second SSD (198) is coupled to the second CPU via the second PCI switch (812). Address space of the second SSD is partitioned amongst the NTBs of the first PCI switch (194), the first CPU, and the NTB of the second PCI switch (812) and a plurality of namespaces of the second SSD (196) is partitioned amongst the NTBs of the first PCI switch (194), the first CPU, and the NTB of the second PCI switch (812). An example of such a system is set forth in FIG. 3.

The method of FIG. 8 also includes receiving (802), in the first PCI switch, a transaction (804) from the first CPU to store a primary copy of data, the transaction to store the primary copy of data comprising a first command, a first drive memory address, and a first identifier of a namespace (826). The method of FIG. 8 also includes storing (806) the primary copy of the data in the first SSD. In the method of FIG. 8, storing (806) the primary copy also includes storing (810) in a queue of the identified namespace in the first SSD, by the first PCI switch, the first command and the first drive memory address.

The method of FIG. 8 also includes receiving (814), by the NTB of the second PCI switch from the first CPU, a transaction (816) to store a redundant copy of the data, where the transaction to store the redundant copy of the data includes a second command, a CPU memory address, and a second identifier of a namespace. The method of FIG. 8 also includes translating (818), by the NTB of the second PCI switch, the CPU memory address to an address (820) in the address space of the second SSD partitioned to the NTB of the second PCI switch. The method of FIG. 8 also includes storing (822) the redundant copy of the data in the second SSD. In the method of FIG. 8, storing (822) the redundant copy also includes storing (824) in a queue of the identified namespace in the second SSD, by the second PCI switch, the second command (828) of the transaction and the translated address of the second SSD.

The method of FIG. 8 enables high availability of data in the case of a full node failure. That is, if the first computing system fails, all data stored by the first and second computing system, redundant or primary, is present and accessible on the second SSD (as well as the first SSD in some embodiments).

Figure 9:
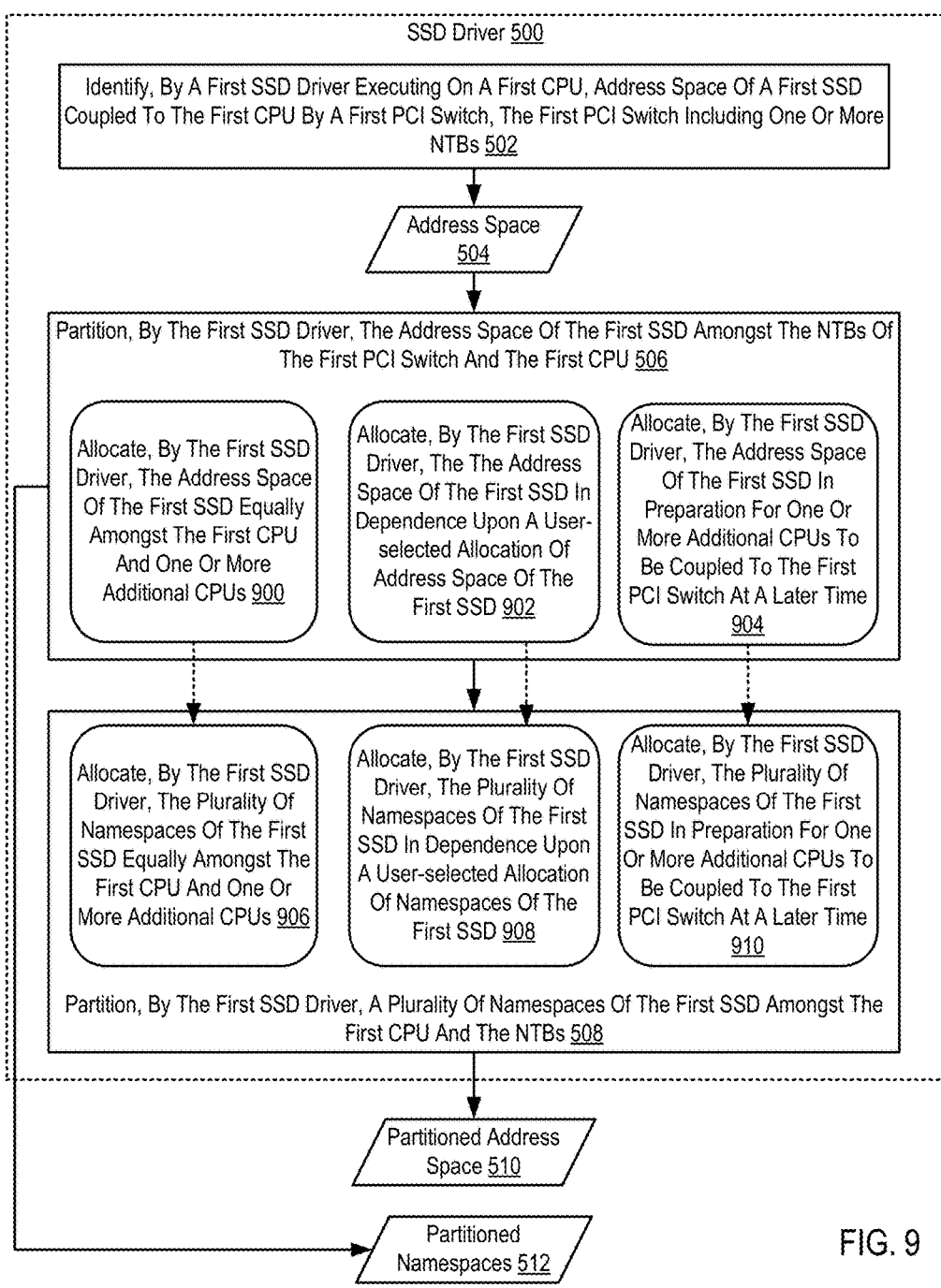
FIG. 9 sets forth a flow chart illustrating an additional method for configuring NVMe devices for redundancy and scaling according to embodiments of the present invention.

For further explanation, FIG. 9 sets forth a flow chart illustrating an additional method for configuring NVMe devices for redundancy and scaling according to embodiments of the present invention. The example method depicted in FIG. 9 is similar to the example method depicted in FIG. 5, as it also includes identifying (502), by a first SSD driver executing on a first CPU (500), address space of a first SSD (504) coupled to the first CPU by a first PCI switch, the first PCI switch including one or more NTBs, partitioning (506), by the first SSD driver (500), the address space of the first SSD amongst the NTBs of the first PCI switch and the first CPU (510), where each NTB is configured to translate CPU memory addresses received from a CPU into a drive address in the address space partitioned to the NTB, and partitioning (508), by the first SSD driver, a plurality of namespaces of the first SSD amongst the first CPU and the NTBs (512).

The example method of FIG. 9 differs from the method of FIG. 5 in that the example of FIG. 9 includes allocating (900), by the first SSD driver (500), the address space of the first SSD equally amongst the first CPU and one or more additional CPUs and allocating (906), by the first SSD driver (500), the plurality of namespaces of the first SSD equally amongst the first CPU and one or more additional CPUs. In a system of four CPUs, for example, each CPU may be allocated a quarter of the available address space. As such, each CPU may store data in the address space allocated to the CPU. An example of such a system is set forth in FIG. 4.

The method of FIG. 9 also includes allocating (902), by the first SSD driver (500), the address space of the first SSD in dependence upon a user-selected allocation of address space of the first SSD and allocating (908), by the first SSD driver (500), the plurality of namespaces and the address space of the first SSD in dependence upon a user-selected allocation of namespaces and a user-selected allocation of address space of the first SSD. The SSD driver or other firmware, for example, may provide a user interface through which a user may specify an amount of address space to assign to CPUs of the system. For illustration, in a system of four CPUs, a user may specify that 40% of the available address space of the SSD be provided to the primary CPU and 10% of the available address space of the SSD be provided to the remaining three CPUs while any additional space is not allocated until a later time. The user may also assign one or more namespaces to each CPU and set namespace parameters, such as size, capacity, formatted logical block address size, End-to-end data protection settings, multi-path I/O and sharing capacity settings, and so on. An example of such a system is set forth in FIG. 4.

The method of FIG. 9 also includes allocating (904), by the first SSD driver (500), the address space of the first SSD in preparation for one or more additional CPUs to be coupled to the first PCI switch at a later time and allocating (910), by the first SSD driver (500), the plurality of namespaces of the first SSD in preparation for the one or more additional CPUs to be coupled to the first PCI switch at the later time. In a system of four CPUs, for example, the SSD driver may allocate six namespaces and six address spaces, where four of the six namespaces and address spaces are allocated to the CPUs and the remaining two namespaces and address spaces are available for additional CPUs to be added to the system at a later time. An example of such a system is set forth in FIG. 4.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
identifying, by a first SSD ('Solid State Drive') driver executing on a first CPU ('Central Processing Unit'), address space of a first SSD coupled to the first CPU by a first PCI ('Peripheral Component Interconnect') switch, the first PCI switch comprising one or more non-transparent bridges ('NTBs');
partitioning, by the first SSD driver, the address space of the first SSD amongst the NTBs of the first PCI switch and the first CPU by allocating portions of the address space to each of the NTBs and to the first CPU, wherein each NTB is configured to translate CPU memory addresses received by the NTB from a different CPU into a drive address in the address space partitioned to the NTB; and
partitioning, by the first SSD driver, a plurality of namespaces of the first SSD amongst the first CPU and the NTBs.

2. The method of claim 1, further comprising:
receiving, by the first NTB of the first PCI switch from a second CPU coupled to the first NTB, a transaction, the transaction including a command, a CPU memory address, and a namespace identifier specifying the namespace partitioned to the first NTB;
translating, by the NTB, the CPU memory address to a drive address in the address space partitioned to the NTB; and
storing, by the PCI switch, in a queue of the namespace specified by the namespace identifier, the command of the transaction and the translated drive address.

3. The method of claim 1 wherein:
a first NTB of the first PCI switch is coupled to a second CPU;
the first PCI switch is coupled to a second SSD, wherein an address space of the second SSD and a plurality of namespaces are partitioned amongst the first CPU and the first NTB; and
the method further comprises:
receiving, by the first NTB from the second CPU, a transaction to store a primary copy of data, the transaction to store the primary copy of data comprising a first command, a first CPU memory address, and a first identifier of a namespace;
translating, by the first NTB, the first CPU memory address to a drive address in the address space of the first SSD partitioned to the first NTB;
storing the primary copy of the data in the first SSD including storing in a queue of the identified namespace in the first SSD, by the first PCI switch, the first command of the transaction to store the primary copy of data and the translated address of the first SSD;
receiving, by the first NTB from the second CPU, a transaction to store a redundant copy of the data, the transaction to store the redundant copy of the data comprising a second command, a second CPU memory address, and a second identifier of a namespace;
translating, by the first NTB, the second CPU memory address to a drive address in the address space of the second SSD partitioned to the first NTB; and
storing the redundant copy of the data in the second SSD including storing in a queue of the identified namespace in the second SSD, by the first PCI switch, the second command of the transaction to store the redundant copy of the data and the translated address of the second SSD.

4. The method of claim 1 wherein:
the first CPU and the first PCI switch comprise a first computing system coupled to the first SSD; and
the first PCI switch is coupled to an NTB of a second PCI switch included in a second computing system, the second computing system comprising a second CPU and the second PCI switch, a second SSD coupled to the second CPU via the second PCI switch, wherein address space of the second SSD is partitioned amongst the NTBs of the first PCI switch, the first CPU, and the NTB of the second PCI switch and a plurality of namespaces of the second SSD is partitioned amongst the NTBs of the first PCI switch, the first CPU, and the NTB of the second PCI switch; and
the method further comprises:
receiving, in the first PCI switch, a transaction from the first CPU to store a primary copy of data, the transaction to store the primary copy of data comprising a first command, a first drive memory address, and a first identifier of a namespace;
storing the primary copy of the data in the first SSD including storing in a queue of the identified namespace in the first SSD, by the first PCI switch, the first command and the first drive memory address;
receiving, by the NTB of the second PCI switch from the first CPU, a transaction to store a redundant copy of the data, the transaction to store the redundant copy of the data comprising a second command, a CPU memory address, and a second identifier of a namespace;
translating, by the NTB of the second PCI switch, the CPU memory address to an address in the address space of the second SSD partitioned to the NTB of the second PCI switch; and
storing the redundant copy of the data in the second SSD including storing in a queue of the identified namespace in the second SSD, by the second PCI switch, the second command of the transaction and the translated address of the second SSD.

5. The method of claim 1 wherein:
partitioning the address space of the first SSD further comprises allocating, by the first SSD driver, the address space of the first SSD equally amongst the first CPU and one or more additional CPUs; and
partitioning the plurality of namespaces of the first SSD further comprises allocating, by the first SSD driver, the plurality of namespaces of the first SSD equally amongst the first CPU and one or more additional CPUs.

6. The method of claim 1 wherein:
partitioning the address space of the first SSD further comprises allocating, by the first SSD driver, the address space of the first SSD in dependence upon a user-selected allocation of address space of the first SSD; and
partitioning the plurality of namespaces of the first SSD further comprises allocating, by the first SSD driver, the plurality of namespaces and the address space of the first SSD in dependence upon a user-selected allocation of namespaces and a user-selected allocation of address space of the first SSD.

7. The method of claim 1 wherein:
partitioning the address space of the first SSD further comprises allocating, by the first SSD driver, the address space of the first SSD for one or more additional CPUs not yet coupled to the first PCI switch; and
partitioning the plurality of namespaces of the first SSD further comprises allocating, by the first SSD driver, the plurality of namespaces of the first SSD for the one or more additional CPUs not yet coupled to the first PCI switch.

8. An apparatus comprising:
a first CPU ('Central Processing Unit');
a first PCI ('Peripheral Component Interconnect') switch, the first PCI switch comprising one or more Non-transparent Bridges ('NTBs');
a first SSD ('Solid State Drive'),
wherein the PCI switch couples the first CPU to the first SSD and the first CPU executes an SSD driver comprising computer program instructions that:
identify, by a first SSD ('Solid State Drive') driver executing on a first CPU ('Central Processing Unit'), address space of a first SSD coupled to the first CPU by a first PCI ('Peripheral Component Interconnect') switch, the first PCI switch comprising one or more non-transparent bridges ('NTBs');
partitioning, by the first SSD driver, the address space of the first SSD amongst the NTBs of the first PCI switch and the first CPU by allocating portions of the address space to each of the NTBs and to the first CPU, wherein each NTB is configured to translate CPU memory addresses received by the NTB from a different CPU into a drive address in the address space partitioned to the NTB; and
partition, by the first SSD driver, a plurality of namespaces of the first SSD amongst the first CPU and the NTBs.

9. The apparatus of claim 8, further configured to:
receive, by the first NTB of the first PCI switch from a second CPU coupled to the first NTB, a transaction, the transaction including a command, a CPU memory address, and a namespace identifier specifying the namespace partitioned to the first NTB;
translate, by the NTB, the CPU memory address to a drive address in the address space partitioned to the NTB; and
store, by the PCI switch, in a queue of the namespace specified by the namespace identifier, the command of the transaction and the translated drive address.

10. The apparatus of claim 8 wherein:
a first NTB of the first PCI switch is coupled to a second CPU;
the first PCI switch is coupled to a second SSD, wherein an address space of the second SSD and a plurality of namespaces are partitioned amongst the first CPU and the first NTB; and
the apparatus is further configured to:
receive, by the first NTB from the second CPU, a transaction to store a primary copy of data, the transaction to store the primary copy of data comprising a first command, a first CPU memory address, and a first identifier of a namespace;
translate, by the first NTB, the first CPU memory address to a drive address in the address space of the first SSD partitioned to the first NTB;
store the primary copy of the data in the first SSD including storing, by the first PCI switch, in a queue of the identified namespace in the first SSD, the first command of the transaction to store the primary copy of data and the translated address of the first SSD;
receive, by the first NTB from the second CPU, a transaction to store a redundant copy of the data, the transaction to store the redundant copy of the data comprising a second command, a second CPU memory address, and a second identifier of a namespace;

translate, by the first NTB, the second CPU memory address to a drive address in the address space of the second SSD partitioned to the first NTB; and store the redundant copy of the data in the second SSD including storing, by the first PCI switch, in a queue of the identified namespace in the second SSD, the second command of the transaction to store the redundant copy of the data and the translated address of the second SSD.

11. The apparatus of claim 8 wherein:

the first CPU and the first PCI switch comprise a first computing system coupled to the first SSD; and the first PCI switch is coupled to an NTB of a second PCI switch included in a second computing system, the second computing system comprising a second CPU and the second PCI switch, a second SSD coupled to the second CPU via the second PCI switch, wherein address space of the second SSD is partitioned amongst the NTBs of the first PCI switch, the first CPU, and the NTB of the second PCI switch and a plurality of namespaces of the second SSD is partitioned amongst the NTBs of the first PCI switch, the first CPU, and the NTB of the second PCI switch; and the apparatus is further configured to:

receive, in the first PCI switch, a transaction from the first CPU to store a primary copy of data, the transaction to store the primary copy of data comprising a first command, a first drive memory address, and a first identifier of a namespace;

store the primary copy of the data in the first SSD including storing in a queue of the identified namespace in the first SSD, by the first PCI switch, the first command and the first drive memory address;

receive, by the NTB of the second PCI switch from the first CPU, a transaction to store a redundant copy of the data, the transaction to store the redundant copy of the data comprising a second command, a CPU memory address, and a second identifier of a namespace;

translate, by the NTB of the second PCI switch, the CPU memory address to an address in the address space of the second SSD partitioned to the NTB of the second PCI switch; and store the redundant copy of the data in the second SSD including storing in a queue of the identified namespace in the second SSD, by the second PCI switch, the second command of the transaction and the translated address of the second SSD.

12. The apparatus of claim 8 wherein:

partitioning the address space of the first SSD further comprises allocating, by the first SSD driver, the address space of the first SSD equally amongst the first CPU and one or more additional CPUs; and partitioning the plurality of namespaces of the first SSD further comprises allocating, by the first SSD driver, the plurality of namespaces of the first SSD equally amongst the first CPU and one or more additional CPUs.

13. The apparatus of claim 8 wherein:

partitioning the address space of the first SSD further comprises allocating, by the first SSD driver, the address space of the first SSD in dependence upon a user-selected allocation of address space of the first SSD; and partitioning the plurality of namespaces of the first SSD further comprises allocating, by the first SSD driver, the plurality of namespaces and the address space of the first SSD in dependence upon a user-selected allocation of namespaces and a user-selected allocation of address space of the first SSD.

14. The apparatus of claim 8 wherein:

partitioning the address space of the first SSD further comprises allocating, by the first SSD driver, the address space of the first SSD for one or more additional CPUs not yet coupled to the first PCI switch; and partitioning the plurality of namespaces of the first SSD further comprises allocating, by the first SSD driver, the plurality of namespaces of the first SSD for the one or more additional CPUs not yet coupled to the first PCI switch.

15. A computer program product comprising a non-transitory computer readable medium, the computer readable medium comprising computer program instructions configured to:

identify, by a first SSD ('Solid State Drive') driver executing on a first CPU ('Central Processing Unit'), address space of a first SSD coupled to the first CPU by a first PCI ('Peripheral Component Interconnect') switch, the first PCI switch comprising one or more non-transparent bridges ('NTBs');

partitioning, by the first SSD driver, the address space of the first SSD amongst the NTBs of the first PCI switch and the first CPU by allocating portions of the address space to each of the NTBs and to the first CPU, wherein each NTB is configured to translate CPU memory addresses received by the NTB from a different CPU into a drive address in the address space partitioned to the NTB; and partition, by the first SSD driver, a plurality of namespaces of the first SSD amongst the first CPU and the NTBs.

16. The computer program product of claim 15, further comprising computer program instructions configured to:

receive, by the first NTB of the first PCI switch from a second CPU coupled to the first NTB, a transaction, the transaction including a command, a CPU memory address, and a namespace identifier specifying the namespace partitioned to the first NTB;

translate, by the NTB, the CPU memory address to a drive address in the address space partitioned to the NTB; and store, by the PCI switch, in a queue of the namespace specified by the namespace identifier, the command of the transaction and the translated drive address.

17. The computer program product of claim 15 wherein:

a first NTB of the first PCI switch is coupled to a second CPU;

the first PCI switch is coupled to a second SSD, wherein an address space of the second SSD and a plurality of namespaces are partitioned amongst the first CPU and the first NTB; and the computer program product further comprises computer program instructions configured to:

receive, by the first NTB from the second CPU, a transaction to store a primary copy of data, the transaction to store the primary copy of data comprising a first command, a first CPU memory address, and a first identifier of a namespace;

translate, by the first NTB, the first CPU memory address to a drive address in the address space of the first SSD partitioned to the first NTB;

store the primary copy of the data in the first SSD including storing, by the first PCI switch, in a queue of the identified namespace in the first SSD, the first command of the transaction to store the primary copy of data and the translated address of the first SSD;

receive, by the first NTB from the second CPU, a transaction to store a redundant copy of the data, the transaction to store the redundant copy of the data comprising a second command, a second CPU memory address, and a second identifier of a namespace;

translate, by the first NTB, the second CPU memory address to a drive address in the address space of the second SSD partitioned to the first NTB; and store the redundant copy of the data in the second SSD including storing, by the first PCI switch, in a queue of the identified namespace in the second SSD, the second command of the transaction to store the redundant copy of the data and the translated address of the second SSD.

18. The computer program product of claim 15 wherein:

the first CPU and the first PCI switch comprise a first computing system coupled to the first SSD; and the first PCI switch is coupled to an NTB of a second PCI switch included in a second computing system, the second computing system comprising a second CPU and the second PCI switch, a second SSD coupled to the second CPU via the second PCI switch, wherein address space of the second SSD is partitioned amongst the NTBs of the first PCI switch, the first CPU, and the NTB of the second PCI switch and a plurality of namespaces of the second SSD is partitioned amongst the NTBs of the first PCI switch, the first CPU, and the NTB of the second PCI switch; and the computer program product further comprises computer program instructions configured to:

receive, in the first PCI switch, a transaction from the first CPU to store a primary copy of data, the transaction to store the primary copy of data comprising a first command, a first drive memory address, and a first identifier of a namespace;

store the primary copy of the data in the first SSD including storing in a queue of the identified namespace in the first SSD, by the first PCI switch, the first command and the first drive memory address;

receive, by the NTB of the second PCI switch from the first CPU, a transaction to store a redundant copy of the data, the transaction to store the redundant copy of the data comprising a second command, a CPU memory address, and a second identifier of a namespace;

translate, by the NTB of the second PCI switch, the CPU memory address to an address in the address space of the second SSD partitioned to the NTB of the second PCI switch; and store the redundant copy of the data in the second SSD including storing in a queue of the identified namespace in the second SSD, by the second PCI switch, the second command of the transaction and the translated address of the second SSD.

19. The computer program product of claim 15 wherein:

partitioning the address space of the first SSD further comprises allocating, by the first SSD driver, the address space of the first SSD equally amongst the first CPU and one or more additional CPUs; and partitioning the plurality of namespaces of the first SSD further comprises allocating, by the first SSD driver, the plurality of namespaces of the first SSD equally amongst the first CPU and one or more additional CPUs.

20. The computer program product of claim 15 wherein:

partitioning the address space of the first SSD further comprises allocating, by the first SSD driver, the address space of the first SSD in dependence upon a user-selected allocation of address space of the first SSD; and partitioning the plurality of namespaces of the first SSD further comprises allocating, by the first SSD driver, the plurality of namespaces and the address space of the first SSD in dependence upon a user-selected allocation of namespaces and a user-selected allocation of address space of the first SSD.

* * * * *